(12) United States Patent
Satou et al.

(10) Patent No.: US 6,729,762 B2
(45) Date of Patent: May 4, 2004

(54) AEROSTATIC GAS BEARING

(75) Inventors: Matsuo Satou, Chiba (JP); Shinichi Togo, Tokyo (JP)

(73) Assignee: Chiba Precision Co., Ltd., Chiba-ken (JP)

( * ) Notice: Subject to any disclaimer, the term of this patent is extended or adjusted under 35 U.S.C. 154(b) by 96 days.

(21) Appl. No.: 10/197,806

(22) Filed: Jul. 19, 2002

(65) Prior Publication Data
US 2003/0044095 A1 Mar. 6, 2003

(30) Foreign Application Priority Data

Aug. 30, 2001 (JP) ........................................ 2001-260744

(51) Int. Cl.$^7$ ............................................. F16C 32/06
(52) U.S. Cl. ...................................................... 384/107
(58) Field of Search ................................ 384/100, 107, 384/111, 113, 114, 118, 120

(56) References Cited

U.S. PATENT DOCUMENTS 3,533,664 A * 10/1970 Dee ............................ 384/111
3,611,532 A * 10/1971 Dee ............................ 384/111
3,998,502 A * 12/1976 Walter et al. ................ 384/107

* cited by examiner

*Primary Examiner*—Thomas R. Hannon
(74) *Attorney, Agent, or Firm*—Venable LLP; Michael A. Sartori

(57) ABSTRACT

In an aerostatic gas bearing, slot sections can be easily processed, bearing stiffness and a load capacity can be improved, and an amount of gas flow can be greatly reduced as compared with a conventional circular slot restriction bearing. A multiplicity of radial slots are formed on both the end surfaces of a bearing member. A bearing housing is assembled by fixing slot side plates on both the side surfaces thereof and accommodated in a casing, and a shaft having an outside diameter slightly smaller than the inside diameter of the bearing housing is inserted through the bearing housing. Gas is fed from a gas feed port and flown into a multiplicity of slots through a peripheral groove and fed-gas introduction path. The gas flows into the radial bearing clearance between the shaft and the inner peripheral surface of the bearing housing, thereby the shaft is rotatably supported. Since the gas is fed to the shaft from the respective slots, the bear rigidity and the load capacity of the bearing are increased and the amount of gas flow in the bearing is reduced.

11 Claims, 8 Drawing Sheets

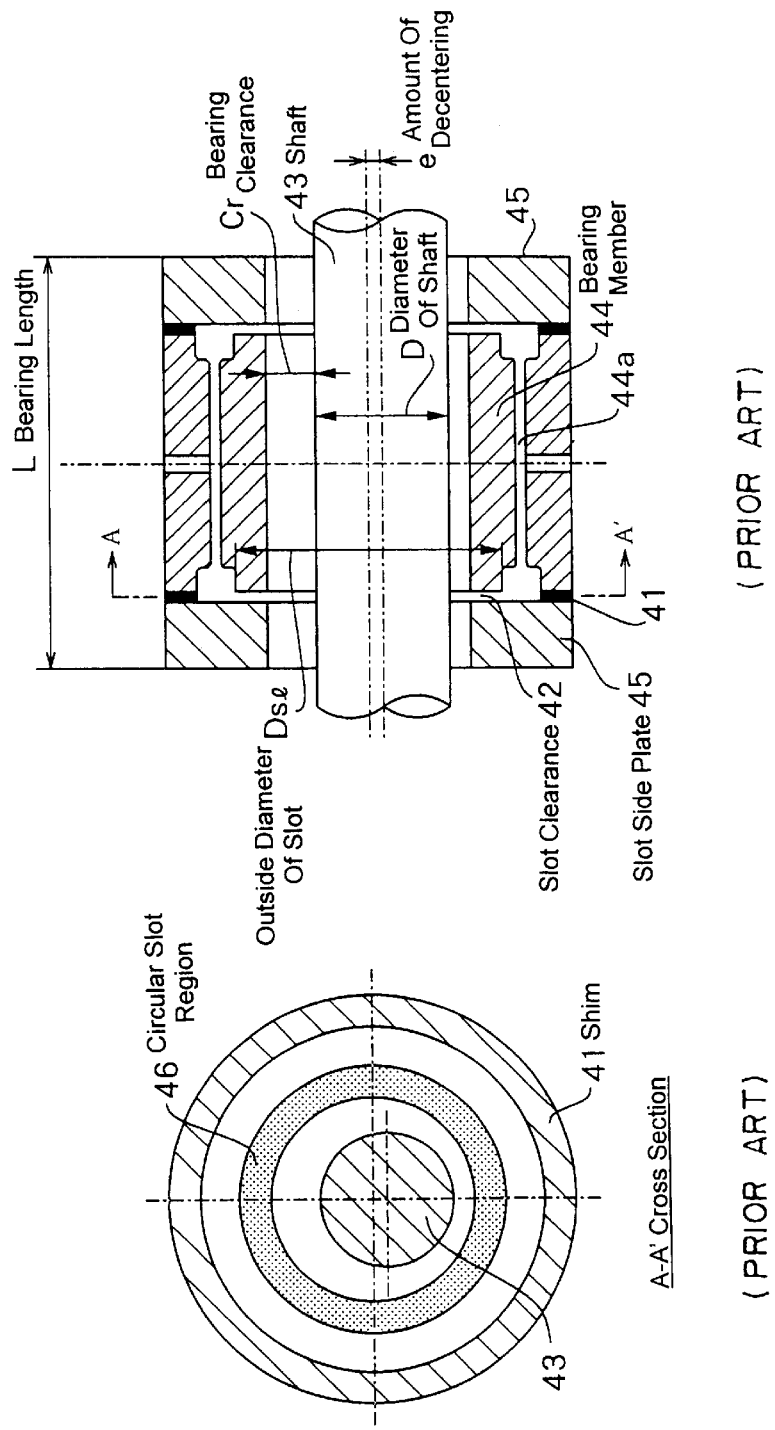

AEROSTATIC GAS BEARING

BACKGROUND OF THE INVENTION

1. Field of the Invention

The present invention relates to a structure of an aerostatic gas bearing, and more specifically, to an aerostatic gas bearing used as a bearing of a spindle for inspecting a hard disc and executing ultra-precise machining, and the like.

2. Description of the Related Art

Conventionally, many aerostatic gas bearings are in practical use in the form of a gas-feed-restriction-type bearing. The aerostatic gas bearings are classified according to gas-feed restriction types that include an orifice restriction excellent in a load capability achieved by forming pockets in gas-feed holes, an inherent orifice restriction for achieving a restriction effectively by a multiplicity of gas-feed holes, and a surface restriction for realizing an aerostatic gas bearing having a very small clearance.

There is a slot restriction as one of the restriction types that is arranged such that the gas-feed holes of an inherent orifice restriction are slenderly extended in a peripheral direction on a bearing surface so as to change point source gas-feed to line source gas-feed. Since the gas supplied into the bearing flows in an axial direction almost uniformly and does not spread, the bearing has such a feature that the bearing stiffness and the load capacity thereof are increased.

Since the slot restriction has the feature described above, there is proposed a circular slot restriction gas bearing as a gas bearing more excellent in the bearing stiffness and the load capacity.

FIG. 11A is a front sectional view showing an example of a conventional circular slot restriction double-row gas feed bearing, and FIG. 11B is a sectional view of the conventional bearing taken long the line A–A' of FIG. 11A.

A shaft 43 is inserted through a cylindrical bearing member 44. In the figures, the clearance between the outer peripheral surface of the inserted shaft 43 and the inner peripheral surface of the bearing member 44 is emphasized by showing the clearance in a large size, and the shaft 43 is shown at a decentered position. A fed-gas introduction path 44a is formed in the bearing member 44 to introduce outside gas to both the end surfaces thereof. Ring-shaped shims 41 are clamped between both the end surfaces of the bearing member 44 and slot side plates 45, and the slot side plates 45 are pressed against the shims 41, thereby slot section clearances 42 are formed between the end surfaces of the bearing member 44 and the slot side plates 45, and a slot region 46 that is circular as a whole is formed.

In the gas bearing having the circular slot restrictions as described above has such a structure that the shims having a thickness corresponding to the slot section clearances are clamped between the bearing member and the slot side plates to obtain the slot section clearances. Accordingly, the gas bearing is produced in such a procedure that after the outer and inner peripheries of the bearing member are ground without clamping the shims between the bearing and the slot side plates, the bearing is disassembled, the shims are clamped between the bearing member and the slot side plates 45, and then the bearing is reassembled in order to prevent the slot section clearances from being filled with cuttings. Therefore, the conventional circular slot restriction bearing has a drawback in that a production procedure is complex.

Further, in the circular slot restriction bearing, it is necessary to make the slot section clearances very small to most suitably design the fine clearance region of the bearing where high rigidity can be obtained. However, it is difficult to produce a thin shim.

In addition, further improvement of a restriction effect is limited in the circular slot restriction because gas flows in a peripheral direction.

According to the above arrangement, since a restriction effect is enhanced, the bearing stiffness of the rectangular slots of the present invention can be improved as compared with that of conventional circular slots as well as the load capacity thereof is also improved when maximum rigidity is exerted. Further, an amount of gas flow can be greatly reduced as well as restricting sections can be easily processed.

SUMMARY OF THE INVENTION

An object of the present invention is to provide an aerostatic gas bearing capable of easily processing slot sections, improving bearing stiffness and a load capacity, and greatly reducing an amount of gas flow as compared with a conventional circular slot restriction bearing.

In order to accomplish the object of the present invention, an aerostatic gas bearing of a slot restriction type having a clearance formed between the bearing and a shaft and rotatably supporting the shaft by introducing compressed gas from the outside to the clearance through restrictions, includes a cylindrical bearing member having a fed-gas introduction path for introducing external gas and a multiplicity of grooves formed radially on the end surfaces thereof, slot side plates for forming a multiplicity of radial slots between them and the bearing member by being pressed against the end surfaces of the bearing member through the side surfaces thereof, and a casing member accommodating the bearing member and having a gas feed port communicating with the fed-gas introduction path, wherein the restriction effect of the introduced gas is increased by flowing the gas to the outer peripheral surface of the shaft inserted through the bearing member from the multiplicity of radial slots.

In the above arrangement of the present invention, a multiplicity of radial grooves are formed on the end surfaces of the cylindrical bearing member, and slot restrictions are arranged by pressing the slot side plates against the end surfaces of the bearing member.

In the above arrangement of the present invention, a peripheral groove is formed on the outer peripheral surface of the bearing member, the fed-gas introduction path is communicated with the side walls of the peripheral groove, and the slot side plates are fixed by screws from the side walls.

The peripheral groove of the present invention has a depth of several microns to several tens of microns.

Further, the radial slots of the present invention is composed of rectangular slots, the slot side plates is formed in a ring shape, and the casing is composed of a cylindrical casing, respectively.

The outside dimension of the slot side plates of the present invention is slightly smaller than that of the bearing member, and thrust slot clearances are formed between the inner peripheral surface of the casing and the outer peripheral surfaces of the slot side plates.

According to the present invention, thrust plates are fixed on both the end surfaces of the bearing member, and thrust bearing clearances are formed between the thrust plates, and the casing and the slot side plates.

According to the above arrangement, since the restriction effect is enhanced, the bearing stiffness of the rectangular slots are improved as compared with that of circular slots, and the load capacity thereof is also improved when maximum rigidity is exerted. Further, an amount of gas flow can be greatly reduced and restricted sections can be easily processed.

BRIEF DESCRIPTION OF THE DRAWINGS

FIG. 11A is a front sectional view showing an example of a conventional circular slot double-row gas feed bearing, and FIG. 11B is a sectional view of the conventional circular slot double-row gas feed bearing taken long the line A–A' of FIG. 11A.

DESCRIPTION OF THE PREFERRED EMBODIMENTS

Embodiments of the present invention will be described below in detail with reference to the drawings.

FIGS. 1A and 1B are a front sectional view and a side elevational view of an embodiment of an aerostatic gas bearing according to the present invention embodied by feeding gas in two rows.

Figure 4A:
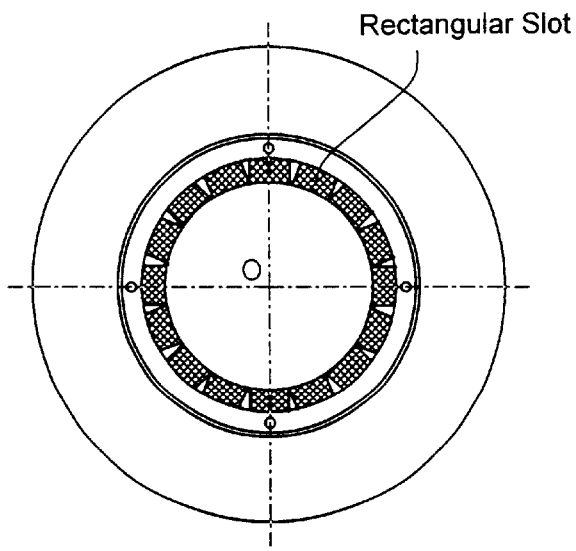
FIGS. 4A and 4B are views explaining a shape of slots and a gas flow of the present invention.

A cylindrical bearing member 2 has a peripheral groove 2a formed in the vicinity of the center of the outer peripheral surface thereof to feed gas. A multiplicity of fed-gas introduction paths 2c are formed in the side walls of the peripheral groove 2a to introduce gas into slots 3. Further, a plurality screw holes 2b are also formed through the side walls to fix slot side walls 5. As shown in FIG. 4A, a multiplicity of the rectangular slots (each having a depth of about 5 µm) are formed radially in both the end surfaces of the bearing member 2.

The ring-shaped slot side walls 5 are fixed by being pressed against both the end surfaces of the bearing member 2 and threaded with screws 15. With this arrangement, the multiplicity of rectangular slots are formed between both the end surfaces of the bearing member and the slot side walls 5. A bearing housing assembled as described above is fixed in a cylindrical casing 6. The cylindrical casing 6 has a gas feed port 7 formed therethrough to introduce the gas, and the gas feed port 7 communicates with the peripheral groove 2a of the bearing member 2. Since the outside dimension of the slot side walls 5 is slightly smaller than that of the bearing member 2, thrust slot clearances 11 are formed between the inner peripheral surface of the casing 6 and the outer peripheral surface of the slot side walls 5.

Since the outside dimension of a shaft 1 is slightly smaller than the inside diameter of the bearing member 2, radial slot clearances 12 are formed therebetween, thereby the shaft 1 is rotatably supported by the gas blown out from the slots and flown between the shaft 1 and the inner peripheral surface of the bearing member 2. Thrust plates 4 are fixed on both the end surfaces of the shaft 1 through screws 14. At this time, thrust bearing clearances 10 are formed between the thrust plates 4, and the casing 6 and the slot side walls 5.

Figure 4B:
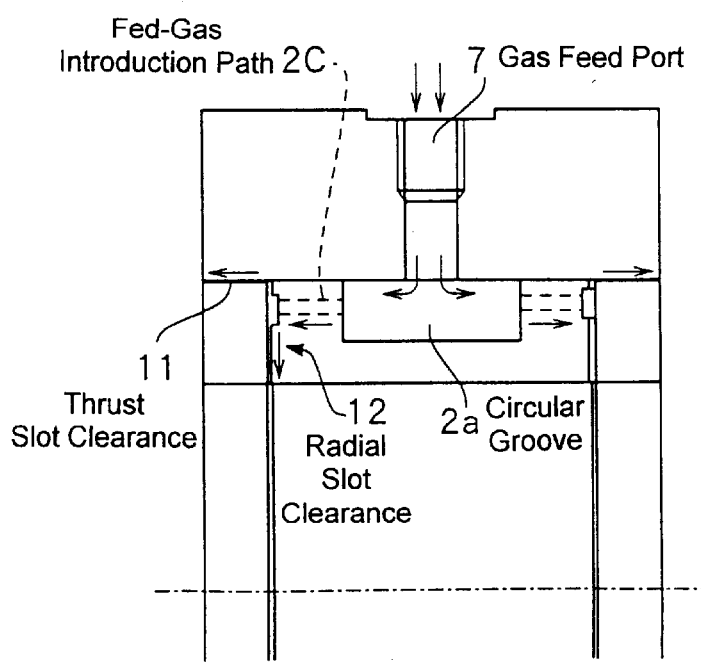

As shown in FIG. 4B, the gas having been flown from the gas feed port 7 passes though the peripheral groove 2a and the fed-gas introduction path 2c, and flows into the radial slot clearances 12 through the multiplicity of rectangular slots. Further, the gas having passed through the fed-gas introduction path 2c partly flows into the thrust bearing clearances 10 through the thrust slot clearances 11.

Figure 2:
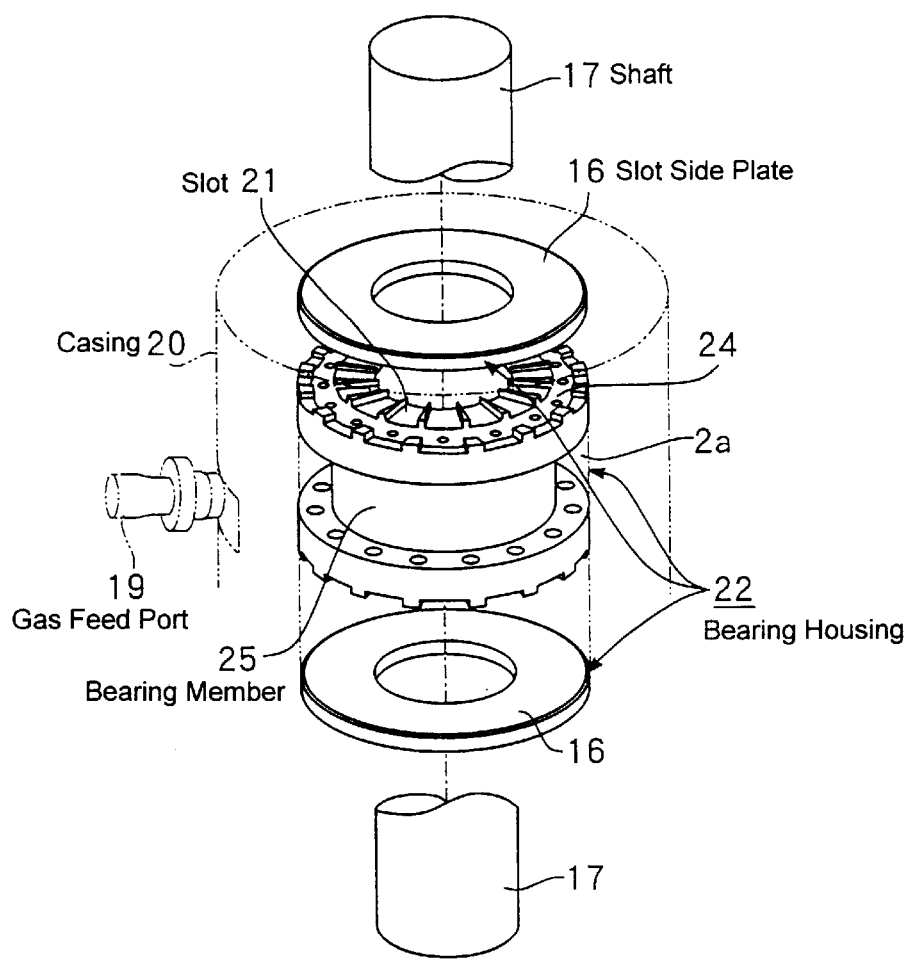
FIG. 2 is an exploded perspective view showing another embodiment of the aerostatic gas bearing according to the present invention.
Figure 3:
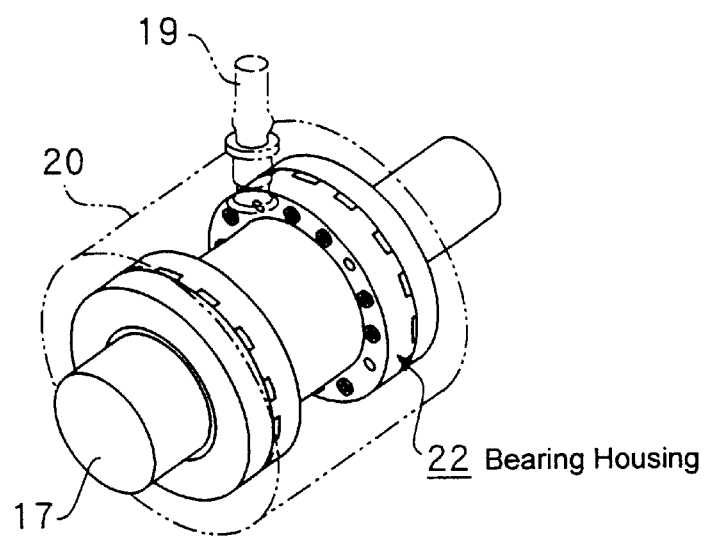
FIG. 3 is an assembled perspective view of the aerostatic gas bearing shown in FIG. 2.

FIGS. 2 and 3 are views showing another embodiment of the aerostatic gas bearing according to the present invention and show an exploded perspective view and an assembled perspective view, respectively.

Figure 1:
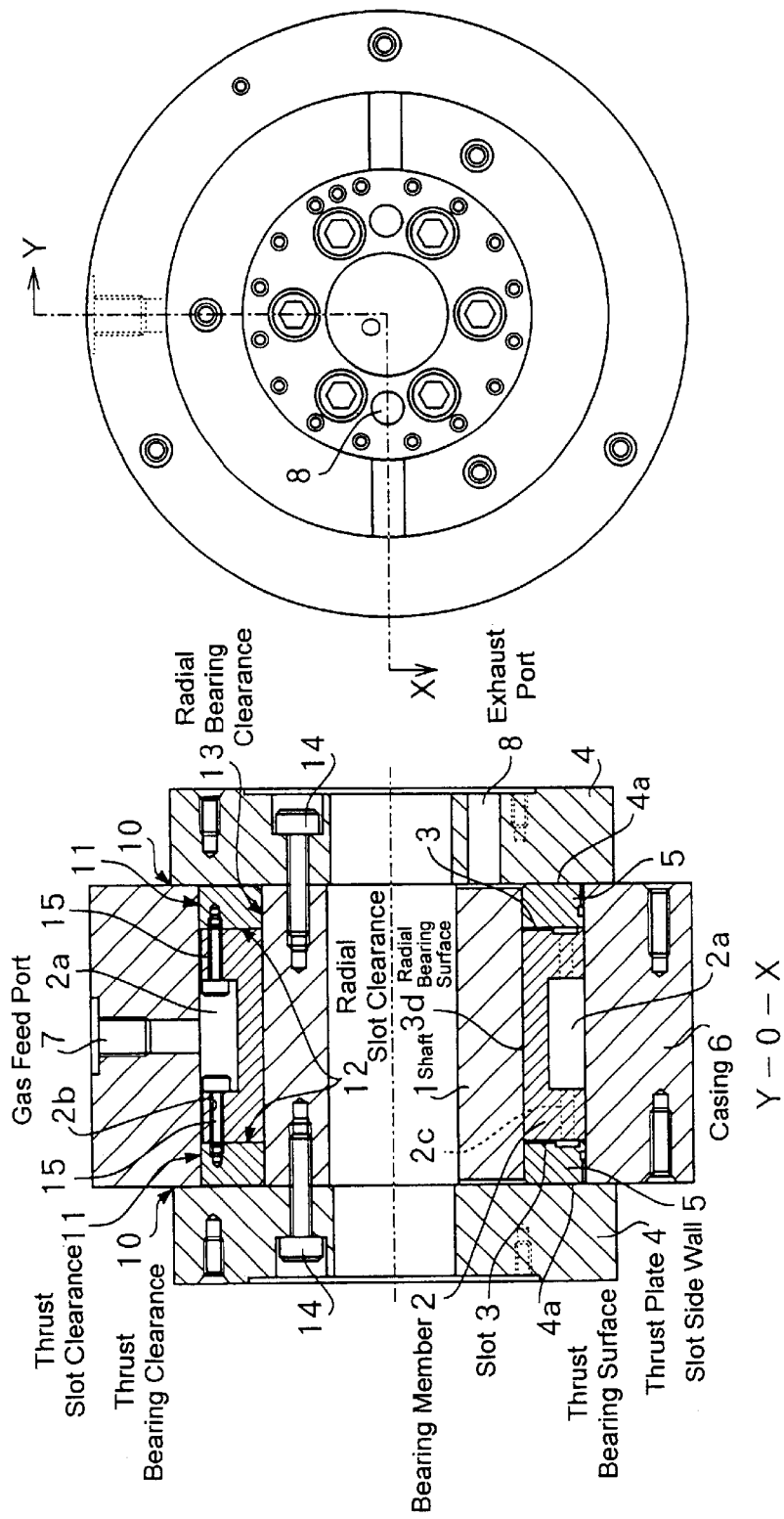
FIGS. 1A and 1B are a front sectional view and a side elevational view showing an embodiment of an aerostatic gas bearing according to the present invention.

This embodiment is arranged similarly to that shown in FIG. 1 except that a shaft is arranged differently from that shown in FIG. 1. A bearing housing 22 is made by assembling a bearing member 25 and slot side plates 16 and accommodated in a casing 20 having a gas feed port 19. A shaft 17 is inserted through the bearing housing 22 at the center thereof.

Figure 5:
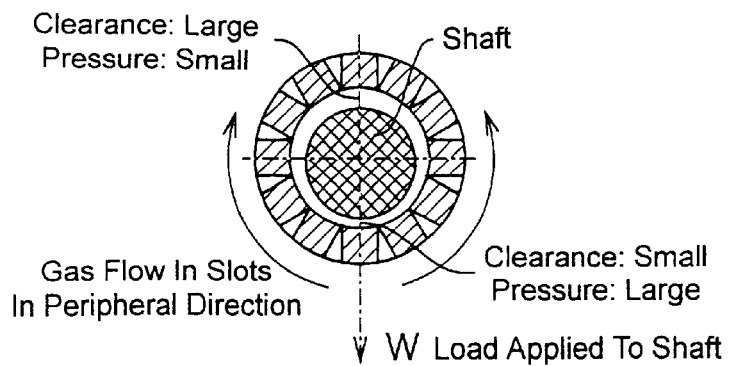
FIG. 5 is a view explaining a gas flow in slots.

FIG. 5 is a view explaining a gas flow in slots.

Figure 6:
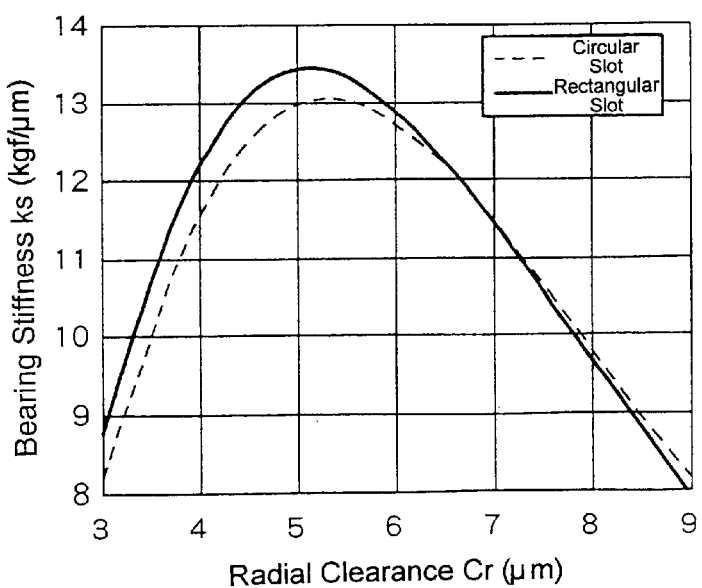
FIG. 6 is a graph showing the relationship between bearing stiffness and a radial clearance in circular slots and rectangular slots.

When, for example, a load W is applied to the shaft downward as shown in FIG. 6, the clearance of the lower surface of the shaft is reduced, thereby pressure is increased by an restriction effect. In contrast, the clearance of the upper surface of the shaft is increased, thereby pressure is reduced by the restriction effect. As a result, a gas flow is produced in a peripheral direction in conventional circular slots. According to the present invention, however, since gas is supplied from the respective rectangular slots, no gas flows in the peripheral direction. As a result, the restriction effect is enhanced, thereby bearing stiffness is improved. Further, a load capacity is improved and an amount of gas flow is greatly reduced when maximum rigidity is exerted.

FIG. 6 is a graph showing the relationship between bearing stiffness and clearance in conventional type circular slots and the rectangular slots of the present invention.

The graph shows a structure of a two-row gas-feed slot restriction in which a bearing member has an inside diameter D of 50 mm, a bearing housing has a width L of 50 mm, each rectangular slot has a clearance depth hsl of 5 µm, and gas pressure ps is 6.033 kgf/cm². These values are also applied to FIGS. 7 and 8. In the graph, the vertical axis shows bearing stiffness ks (unit: kgf/µm), and the lateral axis shows a radial clearance Cr (unit: µm).

As apparent from the graph, at the position where the clearance Cr is 5.0 µm, the conventional type circular slots have the bearing stiffness ks of 12.9787 kgf/µm, whereas the rectangular slots of the present invention have the bearing stiffness ks of 13.3578 kgf/μm. It can be found that the bearing stiffness of the present invention is improved 3% with this clearance.

Figure 7:
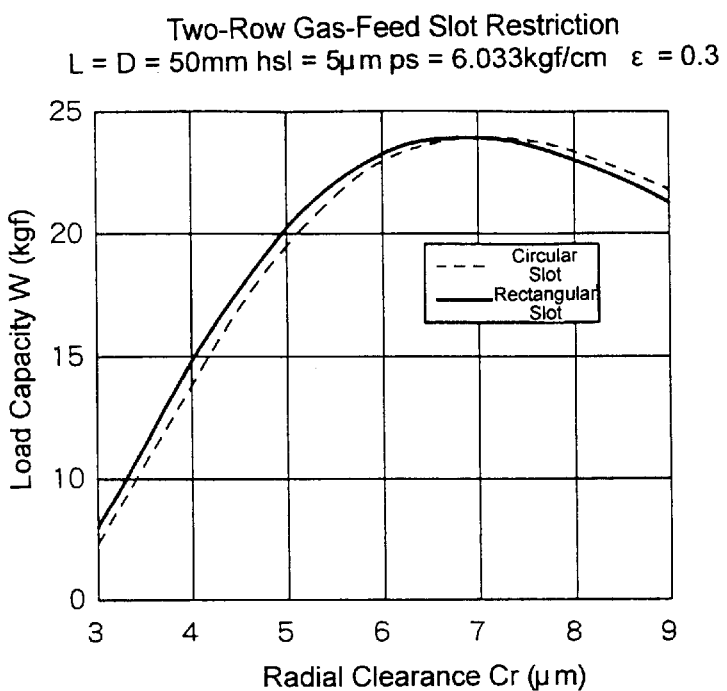
FIG. 7 is a graph showing the relationship between a load capacity and a radial clearance in circular slots and rectangular slots.

FIG. 7 is a graph showing the relationship between a load capacity and a radial clearance in the conventional type circular slots and the rectangular slots of the present invention.

The vertical axis shows a load capacity W (unit: kgf), and the lateral axis shows the radial clearance Cr (unit: μm).

At the position where the clearance Cr is, for example, 5.0 μm, the conventional type circular slots have the load capacity W of 19.4681 kgf, whereas the rectangular slots of the present invention have the load capacity W of 20.1686 kgf. Further, at the position where the clearance Cr is 5.5 μm, the conventional type circular slots have the load capacity W of 21.4899 kgf, whereas the rectangular slots of the present invention have the load capacity W of 22.0404 kgf. Thus, the load capacity W of the present invention is improved about 2.5% with any of the clearances.

Figure 8:
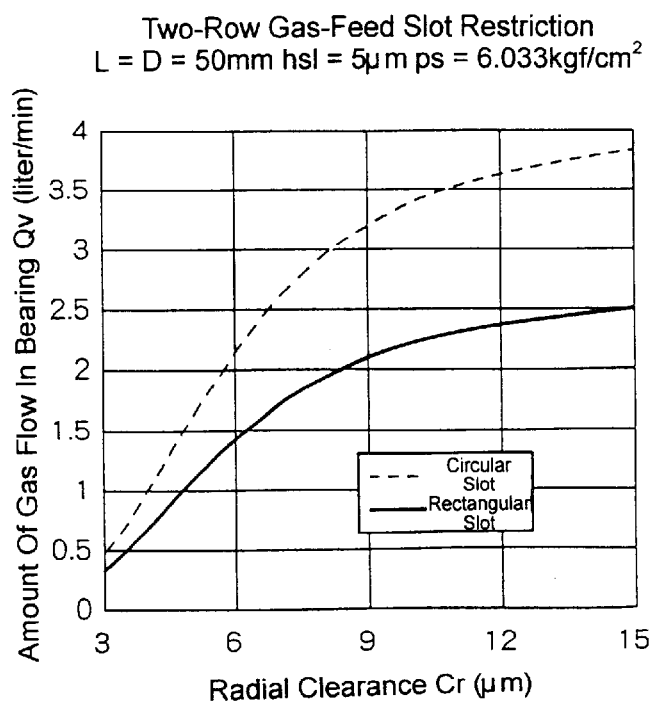
FIG. 8 is a graph showing the relationship between an amount of gas flow in bearing and a radial clearance circular slots and rectangular slots.

FIG. 8 is a graph showing the relationship between an amount of gas flow in bearing and a radial clearance in the conventional type circular slots and the rectangular slots of the present invention.

The vertical axis shows the amount of gas flow in bearing Qv (unit: liter/min) and the lateral axis shows the radial clearance Cr (unit: μm). The amount of gas flow of the rectangular slots of the present invention, when maximum bearing stiffness is exerted, is about 58% that of the conventional type circular slots, and thus it is reduced. At the position where the clearance Cr is, for example, 5.5 μm, the amount of gas flow in bearing Qv of the conventional type circular slots is 1.86581 liter/min, whereas the amount of gas flow in bearing Qv of the rectangular slots of present invention is 1.08985 liter/min.

Figure 9:
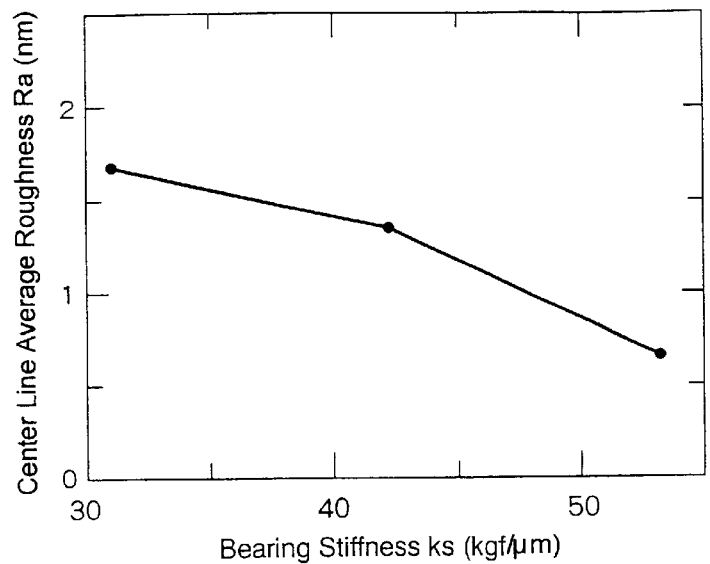
FIG. 9 is a graph showing the relationship between bearing stiffness and plane roughness when the aerostatic gas bearing is applied to an ultra-precise machining spindle.

As an example of application of the present invention, the aerostatic gas bearing can be used in an ultra-precise machining spindle. Since an increase in the bearing stiffness ks decreases center line average roughness as shown in, for example, FIG. 9, the aerostatic gas bearing can be effectively used in a spindle of an aspherical surface machining apparatus and a polygon mirror machining apparatus. Further, the aerostatic gas bearing can be used as a bearing of an inspection device.

Since the aerostatic gas bearing has high bearing stiffness, it is resistant against disturbance from a motor and external disturbance, thereby the rotational accuracy (non-repetitive run-out: NRRO) thereof can be improved. Accordingly, the aerostatic gas bearing is effective as a bearing for a hard disc inspection spindle and a circularity measuring spindle motor.

Figure 10:
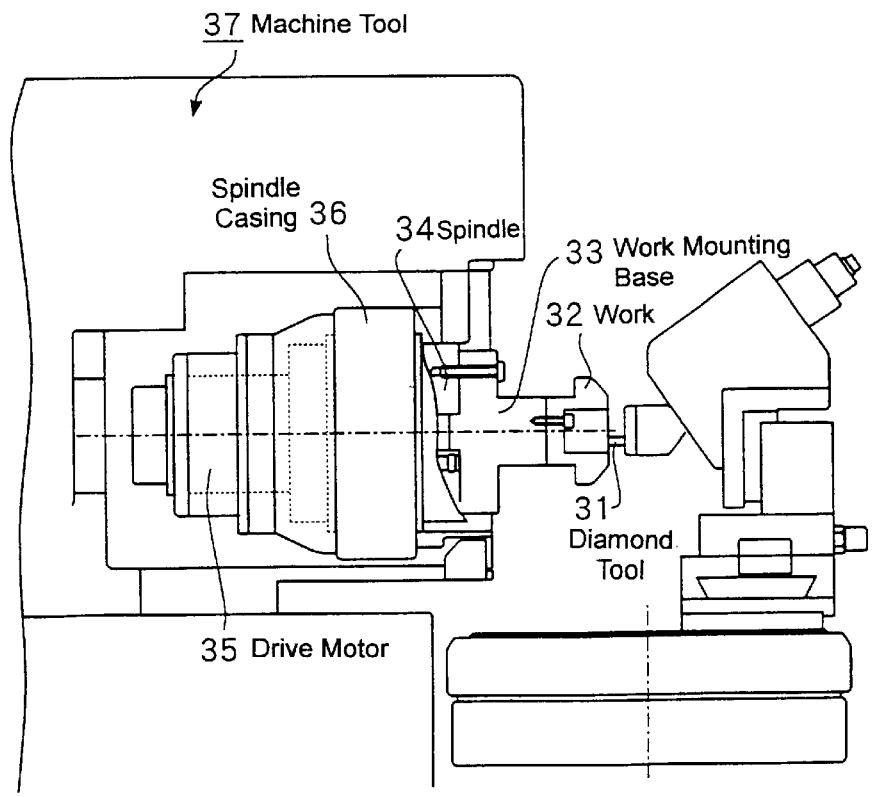
FIG. 10 is a schematic view of a polygon mirror machining apparatus, and the like in which the aerostatic gas bearing is used in an ultra-precise machining spindle.

FIG. 10 is a schematic view of a machine tool such as the polygon mirror machining apparatus, and the like in which the aerostatic gas bearing is used in an ultra-precise machining spindle.

A spindle casing 36 is attached to a drive motor 35, and a spindle 34 using the aerostatic gas bearing according to the present invention is contained in the spindle casing 36. A work 32 is mounted on a work mounting base 33 and cut with a diamond tool 31. Since the bearing stiffness is high, the center line average roughness is reduced, thereby the work can be cut with a high degree of flatness.

Since the present invention is arranged as described above, the following various advantages can be obtained.

1. Enhancement of the restriction effect can improve the bearing stiffness.

2. The load capacity can be improved when the maximum rigidity is exerted.

3. The amount of gas flow can be reduced. Accordingly, a compressor for supplying compressed air to the bearing can be reduced in size, thereby a device to which the bearing is applied can be reduced in size as well as operation power necessary to operate the device can be reduced.

4. The restrictions can be easily processed.

In the conventional type circular slots, processing such as etching, and the like is indispensable to form the slots with a depth of several microns concentrically on a bearing surface. When, however, the rectangular slots are formed radially, it is possible to easily process rectangular grooves by form-plane-grinding using a molding grinding stone.

What is claimed is:

1. An aerostatic gas bearing of a slot restriction type having a clearance formed between the bearing and a shaft and rotatably supporting the shaft by introducing compressed gas from the outside to the clearance through restrictions, comprising:

a cylindrical bearing member having a fed-gas introduction path for introducing external gas and a multiplicity of grooves formed radially on the end surfaces thereof;

slot side plates for forming a multiplicity of radial slots between them and the bearing member by being pressed against the end surfaces of the bearing member through the side surfaces thereof; and a casing member accommodating the bearing member and having a gas feed port communicating with the fed-gas introduction path, wherein the restriction effect of the introduced gas is increased by flowing the gas to the outer peripheral surface of the shaft inserted through the bearing member from the multiplicity of radial slots.

2. An aerostatic gas bearing according to claim 1, wherein a multiplicity of radial grooves are formed on the end surfaces of the cylindrical bearing member, and slot restrictions are arranged by pressing the slot side plates against the end surfaces of the bearing member.

3. An aerostatic gas bearing according to claim 1, wherein a peripheral groove is formed on the outer peripheral surface of the bearing member, the fed-gas introduction path is communicated with the side walls of the peripheral groove, and the slot side plates are fixed by screws from the side walls.

4. An aerostatic gas bearing according to claim 1, wherein the peripheral groove has a depth of several microns to several tens of microns.

5. An aerostatic gas bearing according to claim 1, wherein the radial slots comprise rectangular slots.

6. An aerostatic gas bearing according to claim 1, wherein the slot side plates are formed in a ring shape.

7. An aerostatic gas bearing according to claim 6, wherein the outside dimension of the slot side plates is slightly smaller than that of the bearing member, and thrust slot clearances are formed between the inner peripheral surface of the casing and the outer peripheral surfaces of the slot side plates.

8. An aerostatic gas bearing according to claim 6, wherein thrust plates are fixed on both the end surfaces of the bearing member, and thrust bearing clearances are formed between the thrust plates, and the casing and the slot side plates.

9. An aerostatic gas bearing according to claim 1, wherein the casing comprises a cylindrical casing.

10. An aerostatic gas bearing according to claim 7, wherein the outside dimension of the slot side plates is slightly smaller than that of the bearing member, and thrust slot clearances are formed between the inner peripheral surface of the casing and the outer peripheral surfaces of the slot side plates.

11. An aerostatic gas bearing according to claim 7, wherein thrust plates are fixed on both the end surfaces of the bearing member, and thrust bearing clearances are formed between the thrust plates, and the casing and the slot side plates.

* * * * *